(No Model.)
H. C. JOHNSON & F. M. McMILLAN.
CORPSE COOLER.
No. 266,294. Patented Oct. 24, 1882.
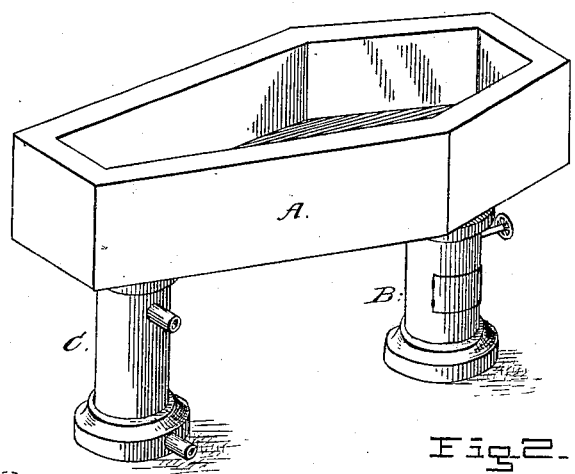
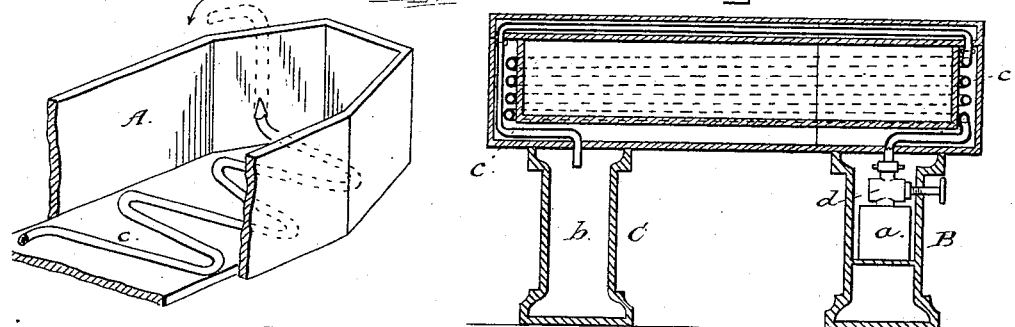
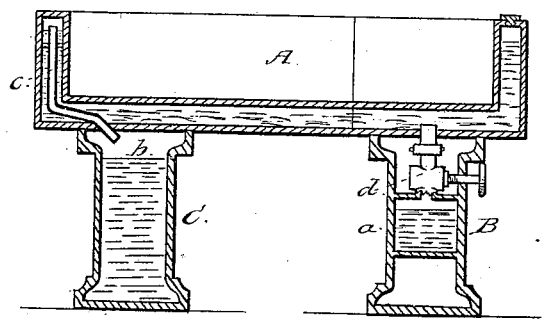
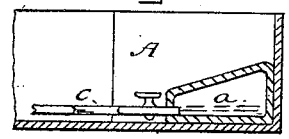
WITNESSES:
Jas. F. DuHamel
Walter S. Dodge
INVENTOR:
Henry C. Johnson,
Francis M. McMillan,
by Dodge & Son
Attys.

UNITED STATES PATENT OFFICE.

HENRY C. JOHNSON, OF WASHINGTON, DISTRICT OF COLUMBIA, AND FRANCIS M. McMILLAN, OF NEW YORK, N. Y.

CORPSE-COOLER.

SPECIFICATION forming part of Letters Patent No. 266,294, dated October 24, 1882.

Application filed August 5, 1882. (No model.)

*To all whom it may concern:*

Be it known that we, HENRY C. JOHNSON, of Washington, in the District of Columbia, and FRANCIS M. McMILLAN, of New York, in the county of New York and State of New York, have invented certain Improvements in Corpse-Coolers, of which the following is a specification.

Our invention relates to corpse-coolers; and it consists in a novel construction thereof, whereby the expansion of a compressed or liquefied gas is caused to effect the cooling or refrigeration, instead of ice, as heretofore.

It is well known that the common ice-pack is a very objectionable affair, being unwieldy and cumbersome, and even when managed with the greatest care producing a slop and litter that are very undesirable. The entire operation as commonly managed is revolting to those present, and an efficient substitute has long been wanted. To produce such a substitute is the purpose of our invention.

In the accompanying drawings, Figure 1 represents a perspective view of our improved cooler; Fig. 2, a longitudinal central section through the same; Figs. 3, 4, and 5, views showing modified arrangements of the gas apparatus.

In carrying out our invention we provide a box of substantially the common form, but preferably made entirely of metal, with hollow walls to contain a non-congealable liquid and the circulating-pipes for the gas, and we support this box upon a base or upon pedestals, one of which contains the compressed or liquefied gas and the other a liquid or substance having a strong affinity for the gas, or empty and serving merely as an escape or relief chamber for the expanded gas.

Referring again to the drawings, A represents a box or receptacle, formed of metal or lined therewith, and having hollow walls, as shown in Fig. 2, and B C represent two pedestals, upon which the box A is supported. The pedestal B contains a gas chamber, *a*, which may be formed in the pedestal itself, or may be a removable receiver or vessel, as shown, and as in practice will be preferred because of convenience in transporting, replenishing, &c.

Within the pedestal C is formed a chamber, *b*, to receive the spent gas, said chamber being, when in use, preferably supplied with a liquid or substance having a strong affinity for the gas employed, so that as the gas expands and ceases to exert further beneficial influence it shall be absorbed by the liquid or substance in the chamber *b*. This arrangement, while preferred, because it avoids the necessity of outlets of any kind and makes the apparatus complete in itself, is not essential to the efficiency of the cooler, as the gas may be conducted through the box-walls or through pipes arranged therein, and then allowed to escape into the atmosphere or into a sewer through a suitable outlet or discharge pipe.

The box or receptacle A is provided with a pipe or pipes, *c*, carried back and forth in the space between its walls, when made in its preferred form, the ends of the pipe being connected respectively with the gas chamber or vessel *a* and the waste-chamber *b*, so that the gas under pressure in the former shall flow through the pipe and be discharged into the latter.

A valve, *d*, is provided in the mouth or outlet of vessel *a*, by which to regulate the discharge of gas, said valve being preferably formed with a stop, as in the Patent No. 257,506, issued to us, bearing date May 9, 1882, to limit the opening thereof and prevent a waste of gas.

The hollow walls of the box or receptacle A are supplied with brine or non-congealable liquid of any kind, which surrounds the pipe *c*, and, becoming intensely cold through its contact therewith, serves to distribute the cold evenly throughout the entire box.

If desired, the gas may be discharged directly into the brine or liquid and an escape-pipe provided to carry off the gas not taken up by the brine into the chamber *b*, as shown in Fig. 3.

Circulating mechanism such as shown and described in our Patents Nos. 257,505 and 257,506, dated May 9, 1882, may also be employed for causing the brine or liquid to circulate through the hollow walls of the box or receptacle; but it is not deemed necessary under ordinary circumstances.

The gas-receiver may be placed within the box or within a coffin or casket, if desired, in which latter case it may be made to take the place of the pillow or head-support commonly used, as in Fig. 5, the coil or pipe c being carried along the bottom or bottom and sides.

To many the idea of freezing a corpse, which would follow the use of the cooler, if worked to its full capacity, is repulsive, and hence we propose in some cases to permit the gas to escape directly into the coffin or casket after expansion, for which purpose the pipe may be arranged, as in Fig. 4, with a small perforation at the end of the pipe, to assist by its disinfecting action or properties in effecting a preservation of the corpse. If, after a time, it be desired to carry off the gas instead of permitting it to escape into the coffin or casket, a rubber pipe may be attached to the pipe c, as indicated in dotted lines in Fig. 4, and the gas carried out of the window; or an outlet-pipe may be connected with the interior of the coffin, box, or casket and arranged to carry off simply the surplus gas.

The apparatus is readily put into operation, it being only necessary to charge the gas-receiver and make connection between the hollow wall-space or pipe c and gas-vessel a, and to open the valve d sufficiently to permit the gas to escape into the space or pipe in a fine thread or stream, as explained in our former patents above referred to.

Where water is used to absorb the spent gas the chamber b may be connected with a water-service pipe to remove the charged water and furnish a fresh supply, suitable connection or outlet being provided to permit a flow of water through said chamber.

We are aware that it is not new to preserve corpses by filling the casket or receptacle in which the corpse is placed with actinized chlorine gas, and we do not broadly claim the preservation of organic bodies or matter by subjecting them to the direct action of an antiseptic gas. We believe, however, that no one has ever before proposed to simultaneously refrigerate and deodorize and disinfect such bodies by the expansion or volatilization of a liquefied gas.

We are also aware that the gas has been discharged, after the operation was finished, into a chimney, sewer, or other place where it would be carried off, and this we do not claim.

Having thus described our invention, what we claim is—

1. The herein-described method of preserving corpses, consisting in expanding a compressed or liquefied gas in a pipe or chamber in the box or coffin containing the corpse, and permitting the gas to escape directly into said box or coffin.

2. A corpse-cooler consisting of a box or receptacle having hollow walls and a gas-receiver communicating with the space within said walls, substantially as shown and described.

3. In combination with the box or receptacle A, having an expansion coil or chamber, as described, pedestals B C, the former containing a gas-receiver, and both communicating with the coil or chamber, substantially as explained.

4. In combination with box or receptacle A, pedestals B C, containing gas-receiver a and chamber b, coil or pipe c, and valve d, all arranged and operating as set forth.

HENRY C. JOHNSON.
FRANCIS M. McMILLAN.

Witnesses:
ALBERT MILLER,
JAMES A. BABSON,
D. D. JOHNSON,
I. R. STANTON.